United States Patent
Kalsi

(10) Patent No.: US 6,791,216 B2
(45) Date of Patent: Sep. 14, 2004

(54) EXCITER FOR SUPERCONDUCTING ROTATING MACHINERY

(75) Inventor: Swarn S. Kalsi, Shrewsbury, MA (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 10/287,412

(22) Filed: Nov. 4, 2002

(65) Prior Publication Data

US 2004/0155538 A1 Aug. 12, 2004

Related U.S. Application Data

(63) Continuation of application No. 09/632,600, filed on Aug. 4, 2000, now abandoned.

(51) Int. Cl.[7] ................................................. H02K 9/00
(52) U.S. Cl. ............................ 310/52; 310/86; 505/166
(58) Field of Search ................................. 310/179, 180, 310/90.5, 216–218, 176, 85–87, 261, 264, 266, 26, 269, 10, 52, 268; 505/166, 211; 336/182, 145, DIG. 1

(56) References Cited

U.S. PATENT DOCUMENTS

| | | | | | |
|---|---|---|---|---|---|
| 3,584,496 A | * | 6/1971 | Keller | ........................ | 72/430 |
| 3,742,265 A | * | 6/1973 | Smith, Jr. | ..................... | 310/52 |
| 3,743,867 A | * | 7/1973 | Smith, Jr. | ..................... | 310/52 |
| 3,940,643 A | | 2/1976 | Sika et al. | ..................... | 310/52 |
| 4,001,617 A | * | 1/1977 | Boyer | .......................... | 310/52 |
| 4,058,746 A | * | 11/1977 | Mole et al. | ................... | 310/10 |
| 4,236,091 A | * | 11/1980 | Kutateladze et al. | .......... | 310/64 |
| 4,281,265 A | * | 7/1981 | Eastham et al. | ............ | 310/254 |
| 4,352,033 A | | 9/1982 | Antonov et al. | .............. | 310/52 |
| 5,099,162 A | * | 3/1992 | Sawada | ....................... | 505/166 |
| 5,256,637 A | * | 10/1993 | Rao | .............................. | 505/1 |
| 5,463,518 A | * | 10/1995 | Otomo et al. | ............... | 505/171 |
| 5,821,659 A | * | 10/1998 | Smith | ......................... | 310/178 |
| 5,909,094 A | * | 6/1999 | Yamada et al. | ............ | 318/140 |
| 5,965,959 A | * | 10/1999 | Gamble et al. | ............ | 307/125 |
| 6,002,193 A | | 12/1999 | Canini et al. | ............... | 310/268 |
| 6,420,842 B1 | * | 7/2002 | Gold | ......................... | 318/141 |

* cited by examiner

Primary Examiner—Dang Le
(74) Attorney, Agent, or Firm—Fish & Richardson P.C.

(57) ABSTRACT

An exciter assembly for supplying power to a superconducting load, such as a superconducting field coil, disposed within a cryogenic region of a rotating machine. The exciter assembly provides an efficient and reliable approach for transferring the electrical power energy across a rotating interface. The exciter assembly includes a transformer having a primary winding and a secondary winding, and a rotatable enclosure including a wall having an intermediate core formed of a high permeability material. The intermediate core is positioned between the primary of a transformer and the secondary of the transformer. In essence, the intermediate core acts as a flux "window" or "shunt" between the primary winding and the secondary winding. One of the primary and secondary windings is generally positioned in a rotational reference frame relative to the other of the primary and secondary windings.

8 Claims, 6 Drawing Sheets

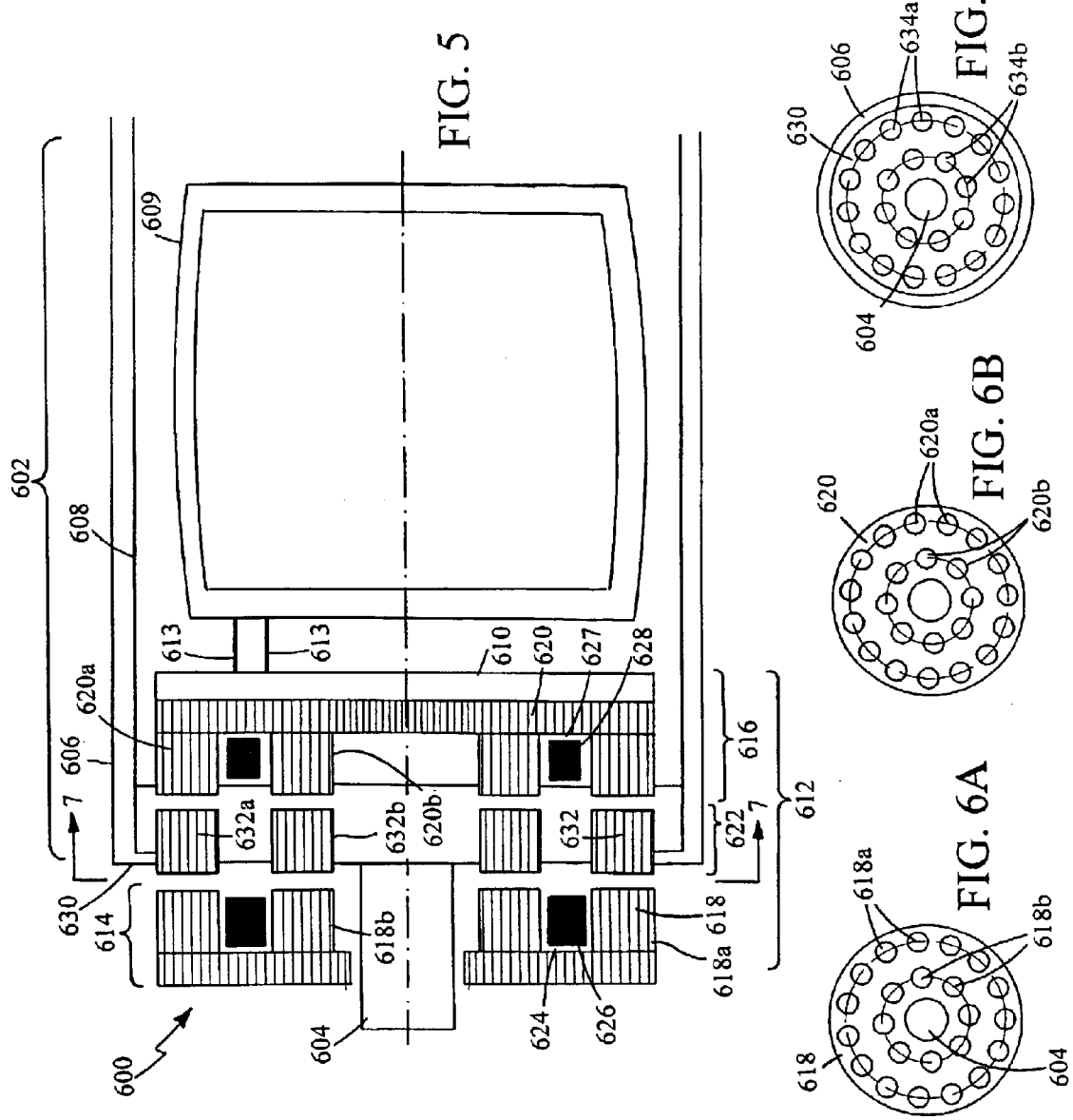

EXCITER FOR SUPERCONDUCTING ROTATING MACHINERY

RELATED APPLICATION

This application is a continuation and claims the benefit of priority under 35 USC 120 of U.S. application Ser. No. 09/632,600, filed Aug. 4, 2000 now abandoned. The disclosure of the prior application is considered part of and is incorporated by reference in the disclosure of this application.

INCORPORATION BY REFERENCE

The following applications are hereby incorporated by referenced into the subject application as if set forth herein in full: (1) U.S. application Ser. No. 09/632,599, filed Aug. 4, 2000, entitled "Superconducting Synchronous Machine Field Winding Protection"; (2) U.S. application Ser. No. 09/632,776, filed Aug. 4, 2000, entitled "HTS Superconducting Rotating Machine"; (3) U.S. application Ser. No. 09/632,601, filed Aug. 4, 2000, entitled "Stator Coil Assembly for Superconducting Rotating Machines"; and (4) U.S. application Ser. No. 09/632,602, filed Aug. 4, 2000, entitled "Segmented Rotor Assembly for Superconducting Rotating Machines.

TECHNICAL FIELD

This invention relates to controlling the flow of current to windings used in rotating machinery, and more particularly to controlling the flow of current to superconducting windings.

BACKGROUND

Superconducting windings are being used in electrical machinery and rotating machines because of their low loss characteristics. While the superconducting windings are maintained at cryogenic temperatures, the power supplies used to drive the superconducting windings are typically maintained at ambient temperatures (300° K.).

In the design of electrical machinery, incorporating high temperature superconducting (HTS) windings (i.e., motors, generators, magnets), the heat leak associated with the leads carrying current from the power supply at ambient temperatures to the cryogenically cooled windings is an overriding design factor which dictates the cost and thermal capacity of closed-cycle cryogenic cooling apparatus. These losses increase as the temperature difference between ambient and coil temperature increases. A number of approaches have been suggested to minimize the impact of heat leaks in such systems especially those in which the leads carry currents approaching several thousand amperes. Unfortunately, where vapor cooling of leads is not an option, these approaches introduce high voltages into the system or do not eliminate the need for a high current lead pair entering the cryogenic environment with attendant heat leaks. In cases where the superconducting coil is rotating with respect to a warm stator coil, the problem of heat leaks into the cryogenic environment becomes more critical due to the design constraints imposed by the thermal path impedance of a stationary cryocooler coupled indirectly to a rotating heat load or constraints on the size, weight, and thermal capacity of a rotating cryocooler.

There exist a number of large scale commercial and defense applications of HTS coils (e.g., magnet systems, generators and synchronous motor field windings) which require relatively constant magnetic fields, and in which ample time is available to ramp the coil current up to its initial desired value prior to regulated operation. In electrical machine systems incorporating HTS windings, the current in the HTS coil is subject to flux creep due to the finite losses in the HTS conductor. The dissipation due to this finite albeit small resistive loss requires that the current be restored periodically, i.e., "pumped" via regulating circuitry back to its desired level. The energy input requirement is only that required to make up for the flux creep. Electronic circuits and mechanisms, which perform these functions, are referred to as "flux pumps".

SUMMARY

The invention features an exciter assembly and approach for supplying power to a superconducting load, such as a superconducting field coil, disposed within a cryogenic region of a rotating machine. The exciter assembly provides an efficient and reliable approach for transferring the electrical power energy across a rotating interface.

In one aspect of the invention, the exciter assembly includes a transformer having a primary winding and a secondary winding, positioned in a rotational reference frame relative to the primary winding, and a rotatable enclosure including a wall having an intermediate core formed of a high permeability material. The intermediate core is positioned between the primary winding of the transformer and the secondary winding of the transformer. In essence, the intermediate core acts as a flux "window" or "shunt" between the primary winding and the secondary winding. This arrangement advantageously eliminates the need for current leads which transition from room temperature to cryogenically cool temperature and are used to provide electrical power from the exciter assembly to the superconducting load. This approach for supplying power to superconducting loads is particularly well suited for HTS superconducting rotating machines, such as those described in co-pending applications, Ser. No. 09/415,626, entitled "Superconducting Rotating Machines", filed Oct. 12, 1999, and Ser. No. 09/481,484, entitled "HTS Superconducting Rotating Machine", filed Jan. 11, 2000, both of which are incorporated by reference.

Embodiments of this aspect of the invention may include one or more of the following features.

The primary winding is in the form of a stationary disk and the secondary winding is in the form of a rotatable disk axially spaced from the stationary disk to form a gap therebetween, the wall of the rotatable enclosure disposed within the gap, at least one of the stationary disk and the rotatable disk is formed of radial laminations, the intermediate core is formed of radial laminations, the stationary disk and the rotatable disk are each formed of core segments, each core section on each of the stationary disk and rotational disk disposed in a radial direction and angularly spaced from another core section of the stationary disk and rotational disk, respectively, and the intermediate core is formed of core segments, each core segment on each of the stationary disk and rotational disk disposed in a radial direction and angularly spaced from the core segments of the intermediate core.

The load is a superconducting coil including high temperature superconductor. The primary winding is in the form of a stationary disk and the secondary winding is in the form of a rotatable disk axially spaced from the stationary disk to form a gap therebetween. In essence, the rotating disk and stationary disk provide a transformer for inducing AC voltage and current in the superconducting load. In one embodiment, the stationary disk and the rotatable disk are formed of radial laminations or other suitable materials.

The exciter assembly can further include a resistive load and a switch for allowing energy from the superconducting load to flow to the resistive load in the event of a detected fault.

In another aspect of the invention, a rotatable enclosure of the type surrounding a housing having an internal volume for supporting cryogenically-cooled components, the rotatable enclosure comprising a wall including a flux window formed of a high permeability material, the flux window positioned between a primary of a transformer disposed external to the rotatable enclosure and a secondary of the transformer disposed within the rotatable enclosure.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a diagrammatic representation of another alternative embodiment of a brushless exciter including an intermediate core.

FIGS. 6A, 6B, and 6C are end views of the stationary core, rotating core, and the intermediate core.

Like reference symbols in the various drawings indicate like elements.

DETAILED DESCRIPTION

Figure 1:
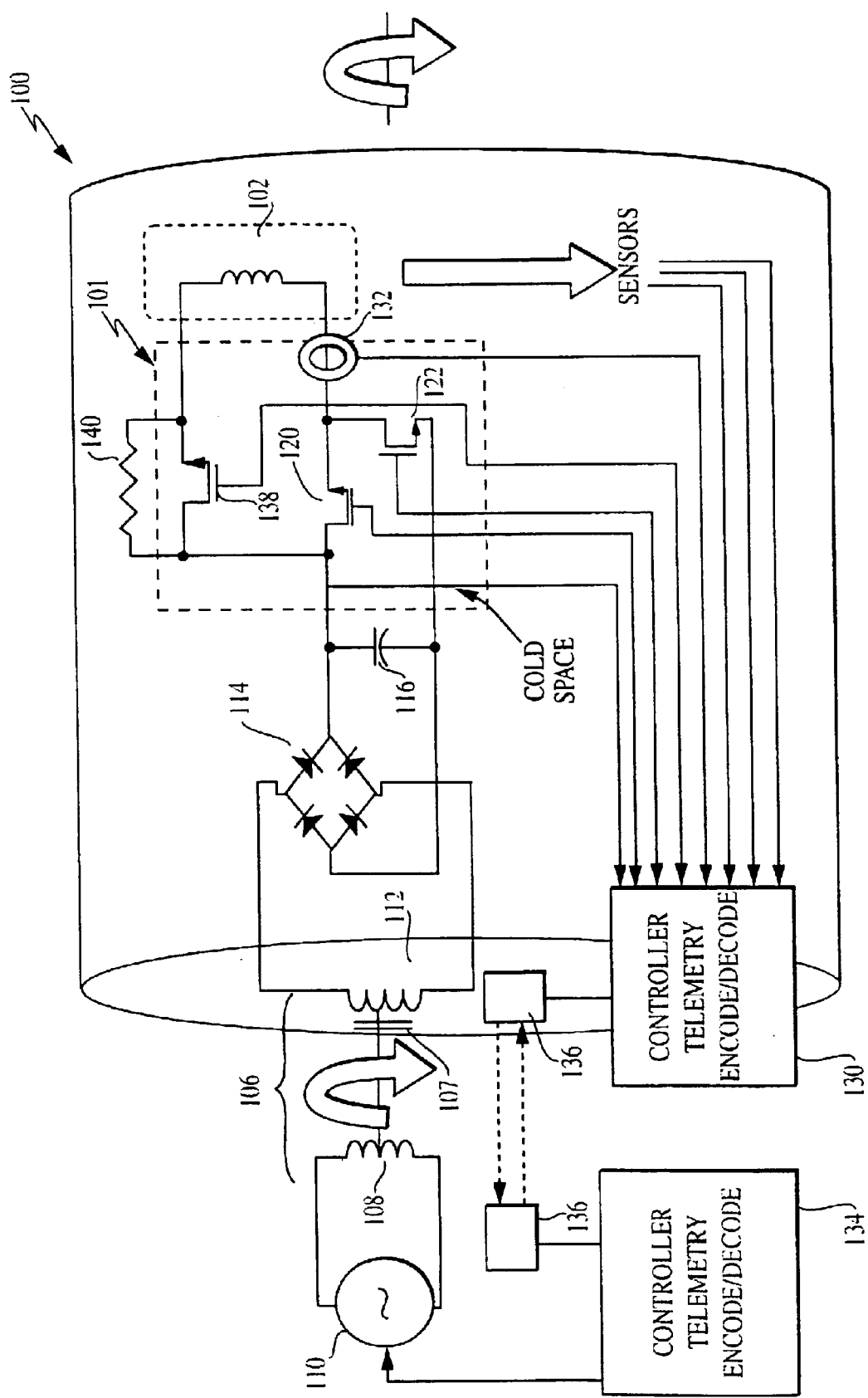
FIG. 1 is a schematic representation of a brushless exciter and regulating circuit in accordance with the invention.

Referring to FIG. 1, a brushless exciter assembly 100 includes a regulating circuit 101 for use with superconducting rotating machinery is shown. In general, the brushless exciter assembly 100 provides the necessary electrical energy to one or more superconducting field windings, for example, windings of a rotor assembly. The superconducting field windings are represented here by an HTS field coil 102 and may be in any of a wide variety of configurations including layer-wound or pancake coils. Field coil 102 is maintained within a cryogenic chamber (e.g., cryostat) of the rotor assembly. The cryogenic chamber (not shown) maintains field coil 102 at temperatures conducive to superconduction (e.g., 20°–110° K.). One example, of a superconducting field winding having a configuration well suited for use in a rotating machine is described in the above referenced application Ser. No. 09/415,626, entitled "Superconducting Rotating Machines" filed Oct. 12, 1999. More particularly, the brushless exciter assembly provides the energy across a rotating reference interface to field coil 102 of the rotor assembly.

As shown in FIG. 1, brushless exciter assembly 100 includes a transformer 106 having a primary winding 108 for receiving current from an AC power source 110 and a secondary winding 112. AC power source 110 is preferably a high frequency excitation source (e.g., 400 Hz to 2 KHz) to permit reduction of the core cross-section and mass of transformer 106. In one embodiment, transformer 106 includes a core 107 constructed of segmented sections of distributed air-gap pressed powder core material, such as powdered iron U-cores. In this case the core segments are separated by air gaps and the core segments are disposed in a radial direction and lie in an angular relationship with respect to one another to form "circular disk" of the transformer core. Brushless exciter assembly 100 also includes a full-wave bridge rectifier 114 connected to secondary winding 112 for rectifying the AC current and providing the DC current required by field coil 102 and a storage capacitor 116. In essence, brushless exciter assembly 100 serves as a "flux pump" for transferring power across the cryogenic barrier in the absence of conductive leads or joints.

Figure 2:
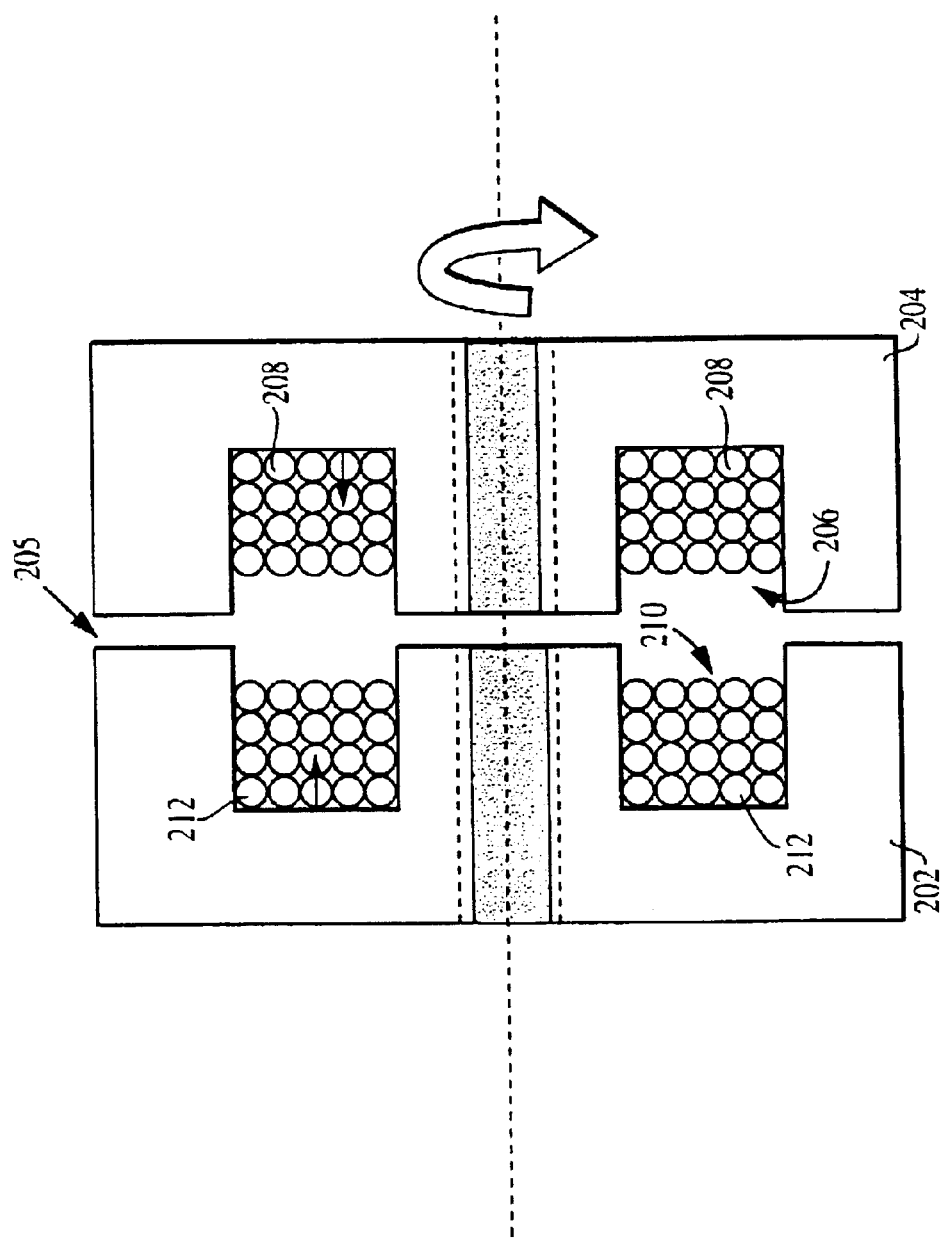
FIG. 2 is a diagrammatic representation of a transformer of the brushless exciter assembly of FIG. 1.

Referring to FIG. 2, primary winding 212 and secondary winding 208 (structural equivalents of primary winding 108 and secondary winding 112 in FIG. 1) include a stationary core 202 and a rotating core 204, respectively. Stationary core 202 is spaced from rotating core 204 by an air gap 205 (e.g., 1–4 mm) and may be mounted, for example, to the stator assembly of the rotating machine. Rotating core 204 is formed of a high permeability material (e.g., laminated iron or powder core) and includes a groove 206 within which a coil winding 208 is disposed. Stationary core 202 is similarly formed of a high permeability material and includes a groove 210 within which a coil winding 212 is disposed. To reduce eddy currents, rotating core 204 and stationary core 202 are formed as laminations separated by varnish or oxide.

Cores 202, 204 are positioned such that winding 208 is positioned directly across from winding 212. Each of the coil windings is wound from a continuous insulated copper wire.

Thus, the disk arrangement provides transformer 106 having secondary winding 112 rotating relative to primary winding 108 of the transformer (or vice versa). An important feature of this particular arrangement is that the flux linkage generated by stationary core 202 and rotating core 204, when stationary, is the same as when the rotating core rotates. In other words, transformer 106 has a design having a rotation invariant coupling between the primary winding and the secondary winding. That is, the induced voltage is independent of rotational speed and instantaneous position of primary windings relative to secondary windings. This feature advantageously allows field coil 102 to be charged prior to rotating core 204 rotating (i.e., before rotating machine operates).

Referring again to FIG. 1, regulating circuit 101 includes a pair of MOSFET switching devices 120, 122 arranged in a half bridge arrangement similar to a synchronous step-down ("buck") DC-DC converter topology. In this embodiment, however, the conventional LC output filter has been replaced with field coil 102 with the converter used to regulate the average field excitation current.

As in any superconducting magnet coil, the HTS field coil must be monitored for incipient quench and a provision must be made to dump the energy stored in the coil in sufficient time to prevent catastrophic failure. Thus, to address this concern, the persistence of an additional switching device 138 in series with the coil. Thus, switch 138 is normally closed and shunts out a dump resistor 140 used to dissipate energy from field coil 102 in the event of a quench. That is, in normal operation, switching device 138 is normally conducting to allow current to bypass dump resistor 140, which is preferably positioned outside the cold space of the rotor assembly.

Further, in this embodiment, MOSFET devices 120, 122 are n-channel enhancement mode devices exhibiting low on-resistance and supporting the maximum reverse voltage in the voltage regulator without breakdown. Moreover, MOSFET devices are cryogenically cooled to advantageously decrease its on-resistance, but at the expense of reducing its operating voltage rating (e.g., as much as 20%). In certain embodiments, to further decrease the on-resistance of the MOSFET switching devices, several MOSFET devices are connected in parallel. Indeed, many MOSFET devices can be combined in a large parallel array.

Field current controller 130 contains a pair of gate driver circuits for controlling the respective gates of MOSFET devices 120, 122. The gate drivers are responsive to logical control signals, one being the inversion of the other. In embodiments in which MOSFET devices 120, 122 are cryogenically cooled it is generally preferable to cryogenically cool field current controller 130 as well.

In operation, alternating current supplied from AC power source 110 induces a changing magnetic field in primary winding 108 which, in turn, induces alternating current flow in secondary winding 112. Rectifier 114 converts the alternating current induced in secondary winding 112 into direct current. The direct current is selectively transferred to field coil 102 by MOSFET devices 120, 122. In particular, MOSFET devices are controlled by controller 130 to alternately (1) provide charging current to field coil 102 ("ramping" mode) and (2) recirculating current in the field coil ("persistence" mode).

In ramping mode, MOSFET device 122 is closed, while MOSFET device 120 is open. As a result, DC current from rectifier 114 (and capacitor 116) is applied to field coil 102, thereby ramping up the current flow. In ramping mode, the DC current is supplied until the desired current levels within field coil 102 are achieved, at which time the respective states of MOSFET devices 120, 122 are changed to place voltage regulator into persistence mode.

In persistence mode, MOSFET device 122 is open, while MOSFET device 120 is closed to shunt current flowing through field coil 102. At cryogenic temperatures, field coil 102 is superconducting and has a relatively low loss. Thus, aside from the low loss of the field coil, a substantial portion of loss in the persistence mode is attributable to MOSFET device 120. MOSFET device 120 is designed for minimum voltage drop since it carries current for a majority of the time (the field coil 102 presumably reasonably persistent). Further details of the operation of a switching circuit operated in accordance with alternating ramp up and persistence modes is described in U.S. Pat. No. 5,965,959, assigned to the assignee of the present invention, and incorporated herein by reference.

It is appreciated that MOSFET switching devices 120, 122 are not active simultaneously. Indeed, simultaneous control is prevented by switching controller 130 and, in accordance with standard practice, a short time interval or "deadtime" is permitted to elapse between the activation of MOSFET devices 120, 122. Furthermore, because operation of MOSFET switching devices 120, 122 is mutually exclusive, in certain embodiments, only one logic signal is required to operate switching control. That is, the gate drive signals that are provided by switch controller 130 are essentially complementary logic signals.

As discussed above, direct current from rectifier 114 (and capacitor 116) is applied to field coil 102, to ramp up to a final excitation current level in field coil 102 in a relatively short time (e.g., several seconds). At this point, MOSFET switches 120, 122 are switched to place the regulator in persistence mode. Once in the persistence mode tile input current flowing through primary winding 108 drops essentially to zero. Switch controller 130 uses a sensing circuit 132 to monitor the current level at field coil 102. Due to the low loss characteristic of the field coil, the field excitation current decays slowly. However, when sensing circuit 130 detects a drop below a predetermined threshold value (e.g., 1% of the final excitation current), MOSFET switch 122 is activated for a very short period (e.g., <10 msecs) to pump the current in field coil 102 back up to the desired final excitation current level. In particular, capacitor 16 discharges for that short period (generally less than ¼ of a sine wave) to pump up field coil 102, at which point MOSFET devices 120, 122 are switched to place regulator back into persistence mode. The field current is periodically restored by controlling the duration of operation the pump switch as required. It will be appreciated that the transfer of energy from the capacitor to the field coil is a resonant discharge of the capacitor. The capacitor cannot be allowed to discharge beyond zero volts or the coil will recharge it in the opposite polarity due to the resonant behavior. Thus, the maximum duration of the restorative operation is one-quarter of the resonant period of the capacitor with the coil inductance. This would also correspond to the maximum increment of current increase in the inductor at the end of the restorative cycle. The controller is programmed to adjust or regulate the incremental change in coil current per pump cycle to be less than the maximum increment available by adjusting the duration of switch operation.

In essence, capacitor 116 serves to provide a "trickle" charge to field coil 102 at relatively infrequent times and for a relatively short duration. For example, field coil 102 may only require tens of milliseconds to pump up with several minutes passing between periods of recirculation. An important advantage of controlling regulating circuit 101 in this way relates to transformer 106. Specifically, because current flows through the transformer windings 108, 112 for only very short periods of time, a transformer having windings with a much lower rating can be used. Indeed, the size and rating of the secondary winding can be selected such that it is allowed to operate above its normal rating for the short period of time needed to charge field coil 102 to its desired value during the initial ramp up period.

A data logging and master motor controller 134 is provided to receive and store data from field current controller 130. Bidirectional communication between field current controller 130 on the rotating side and the data logging and master motor controller 134 on the stationary side of the motor is required. Setpoint commands for controlling the field current must be issued and acted upon by the control electronics and rotating power electronics. While the rotating control is autonomous for any setpoint currently issued, the rotating control must acquire and monitor coil voltage and current for both current regulation and coil protection. Controller 134 must receive telemetry indicating status on the rotating side. This status may include temperatures and other data indicating the condition of the field coil. Field coil controller 130 includes a microcontroller with A/D conversion and digital I/O to locally control the switching devices for regulation of coil current, sense coil conditions, and telemeter data and status to the stationary side.

The bi-directional communication uses pulse code modulated carrier infrared optical transmission and reception. The interface protocol for communicating with controller 134 may thus be made standard RS-232 or RS-485, thus permitting any serial port equipped computer to communicate with the motor. In one embodiment, 56.8 kHz carrier modulated at 1200 baud serial data rate is used. The transmitter and receiver are closely coupled, and the received signal is made rotation invariant, as was the case above with the primary and secondary windings of transformer 106. Rotation invariance is achieved through the use of several synchronously drive 940 nm IR emitters 136 to form an area (ring) light source. The rotating side microcontroller converts acquired signals and transmits digitally encoded data strings to the stationary side on a regularly determined time schedule. Commands from the stationary side are sent to the rotating side as required to change the setpoint for the field current. The communication is half-duplex, thus one wavelength can be used for both transmission and reception across the rotating boundary. It is appreciated that somewhat higher or lower modulation frequencies are useable and that other IR wavelengths are also acceptable.

Figure 3:
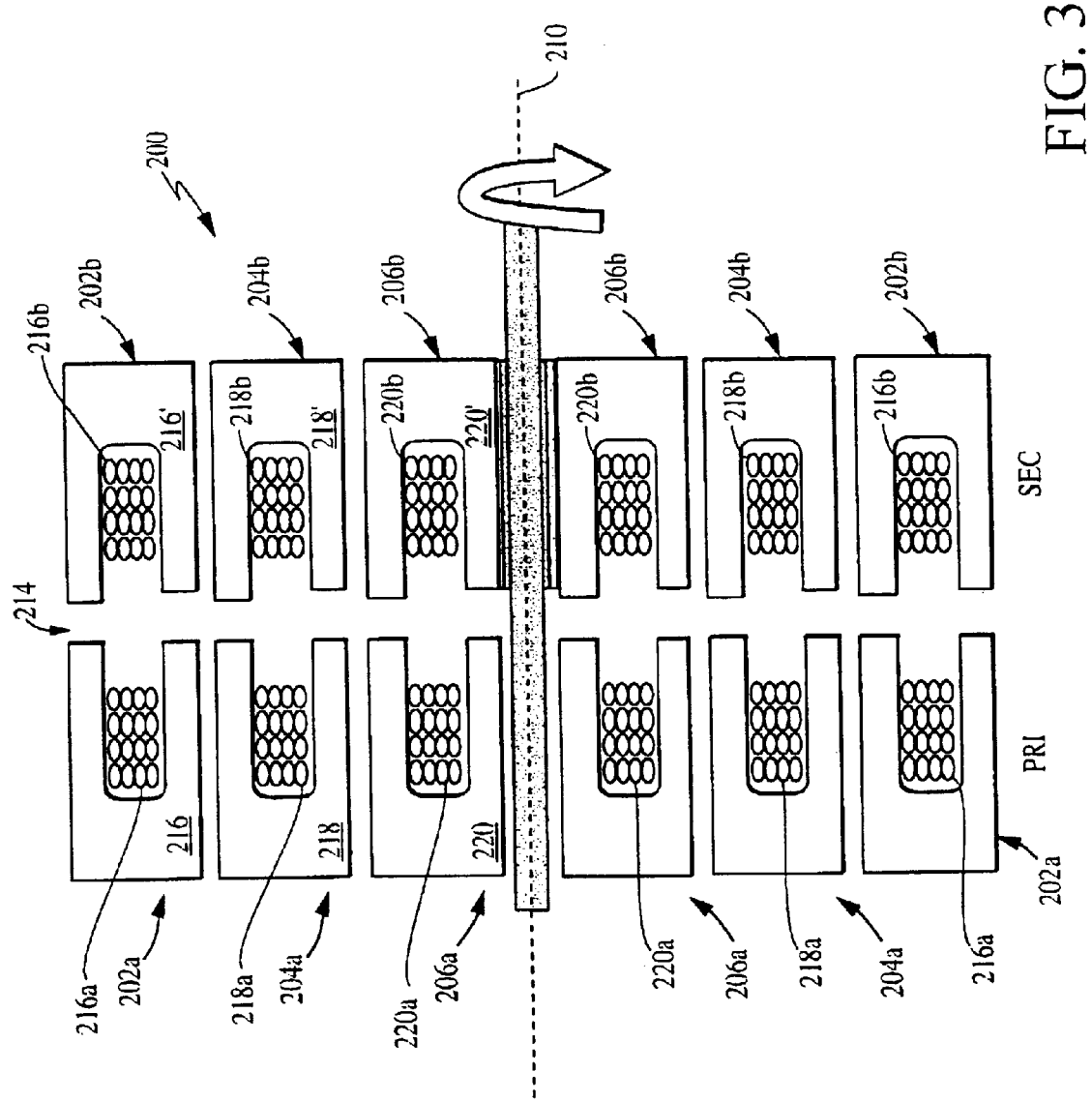
FIG. 3 is a diagrammatic representation of a polyphase transformer used in a polyphase embodiment of the invention.

Referring to FIG. 3, a three-phase exciter transformer 200 is shown to include three primary structures 202*a*, 204*a*, 206*a* and corresponding secondary structures 202*b*, 204*b*, 2026*b*. Primary structures 202*a*, 204*a* and 206*a* are concentrically disposed around a longitudinal axis 210 of the transformer and are radially spaced from each other. Secondary structures 202*b*, 204*b* and 206*b* are similarly positioned around axis 210 and are axially spaced from corresponding primary windings by a gap 214 (e.g., 1–mm). Each primary structure includes U-shaped core members 216, 218, 220 formed of a relatively high permeability material for supporting primary windings 216*a*, 218*a*, 220*a*. The primary windings are positioned in opposing relationship with secondary windings 216*b*, 218*b* and 220*b* supported in U-shaped core members 216', 218', and 220'. The U-shaped core members 216, 216', 218, 218', 220, and 220' can be replaced, in certain embodiments, with an E-shaped core. Each of primary structures 202*a*, 204*a* and 206*a* are driven by a corresponding phase of a three-phase AC source (not shown). Secondary structures 202*b*, 204*b*, and 206*b* are connected to a conventional solid-state polyphase rectifier.

Figure 4:
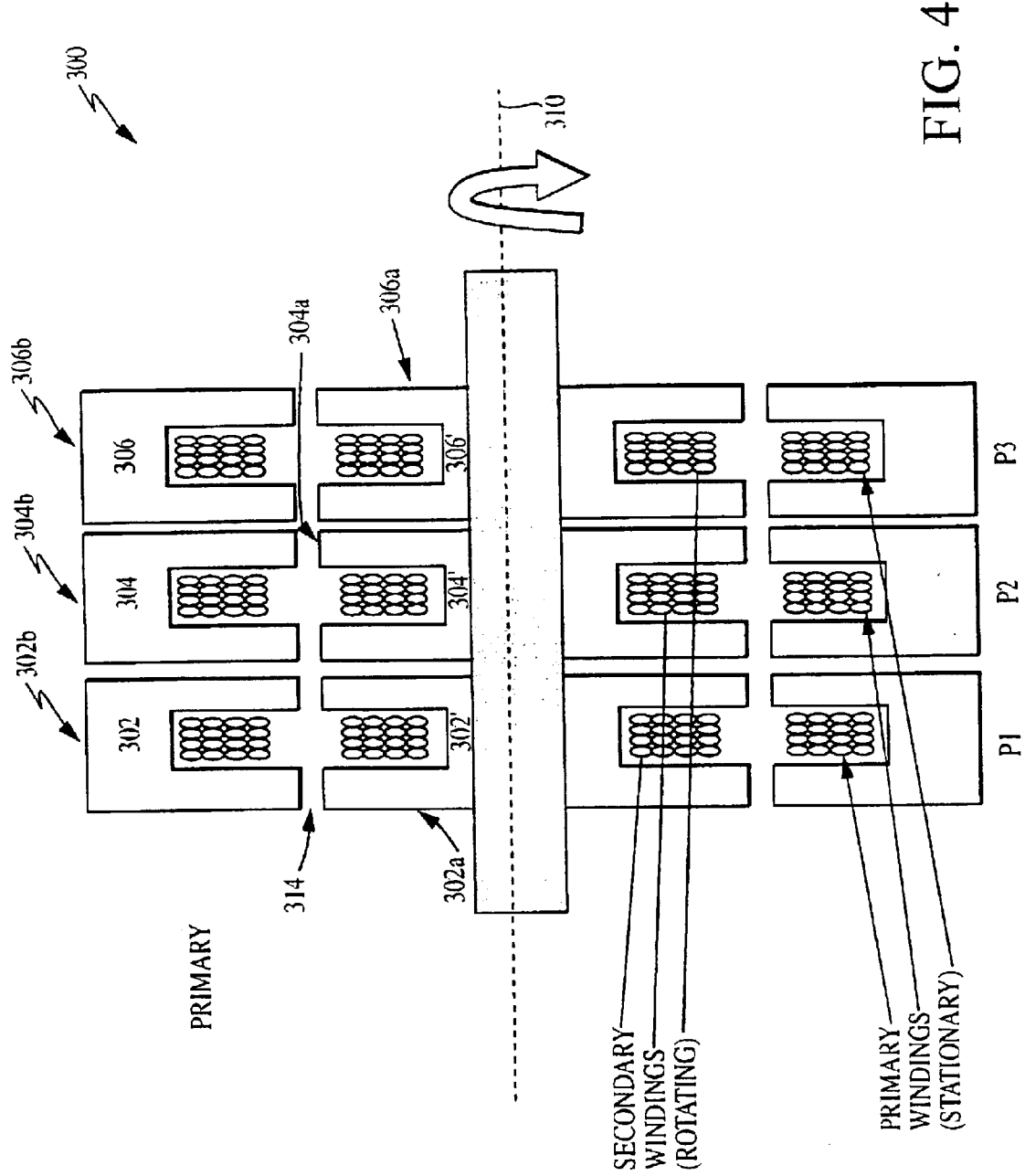
FIG. 4 is a diagrammatic representation of an alternative embodiment of a polyphase transformer.

In an alternative embodiment, as shown in FIG. 4, a three-phase transformer 300 includes three secondary 302*a*, 304*a*, 306*a* surrounded by three concentrically mounted primary structures 302*b*, 304*b*, 306*b* along an axis 310. As was the case described above, windings of the primary structures are supported by U-shaped core members 302, 304, 306 and windings of the secondary structures are supported within corresponding U-shaped core members 302', 304', and 306'. U-shaped core members 302, 304, 306 are spaced from corresponding U-shaped core members 302', 304', and 306' by a gap 314. As was the case described above, the set of three U-shaped core members 302, 302', 304, 304', 306, and 306' can also be replaced with an E-shaped core.

Referring to FIG. 5, in still another embodiment, a brushless exciter assembly 600 is shown for use in conjunction with a rotor assembly 602 of a superconducting electric machine (e.g., motor). Rotor assembly 602 includes a shaft 604 coupled to a warm-room temperature enclosure 606 within which is a cylindrically-shaped chamber 608 a cryogenic temperatures. Cryogenic chamber 608, in turn, encloses a superconducting coil 609 and a regulating circuit 610, each of which may be similar to HTS field coil 102 and regulating circuit 101 shown in FIG. 1. As was the case described above, regulating circuit 610 is used to rectify and control charging and discharging of field coil 609.

Brushless exciter assembly 600 also includes a transformer 612 having a primary winding 614 for receiving current from an AC power source and a secondary winding 616. The AC power source is preferably a high frequency excitation source (e.g., 400 V, 400 Hz) to permit reduction of the core cross-section and mass of the transformer 106. Primary winding 614 and secondary winding 616 include a stationary core 618 and a rotating core 620, respectively. Stationary core 618 is spaced from rotating core 620 by a gap 622 (e.g., 25–45 mm) and is mounted in this embodiment to the stator assembly of the rotating machine. Each of stationary core 618 and rotating core 620 include a pair of rings (618*a*, 618*b* and 620*a*, 620*b*) that define grooves 624, 627 within which coil windings 626, 628 are disposed. Note that coil winding 628 is disposed within the cryogenic chamber 608. Stationary core 618 and rotating core 620 are both formed of a high permeability material (e.g., iron) and are formed as laminations separated by varnish or oxide to reduce eddy currents.

Positioned within gap 622 and between primary 614 and secondary 616 is an end wall 630 of room temperature enclosure 606. End wall 630 includes an intermediate core 632 extending theretrough for magnetically coupling flux produced by primary 614 in the stationary reference frame to secondary 616 in the rotating reference frame. Thus, intermediate core 632 is incorporated in the "warm" (i.e., room temperature) wall of the rotating enclosure 606. In essence, intermediate core 632 acts as a flux "window" or "shunt" between the stationary core 618 and rotating core 620. Importantly, this arrangement eliminates the need for current leads which transition from room temperature to cryogenically cool temperature. Thus, losses normally associated with the use of current leads are eliminated. This permits operation of the superconducting coils at very high currents.

Intermediate core 632 can be formed as a pair of radially spaced rings 632*a*, 632*b*, each of which is axially spaced from rings 618*a*, 618*b* of stationary core 618 and rings 620*a*, 620*b* of rotating core 620.

Referring to FIGS. 6A, 6B, and 6C, in another embodiment, however, stationary core 618, rotating core 620 and intermediate core 632 are constructed of segmented core sections 634 of distributed air-gap pressed powder core material, such as powdered iron or amorphous metal. In this embodiment, the segmented core sections are circular in shape and are radially spaced from each other along the same diameters and define rings 618*a*, 618*b*, 620*a*, 620*b*. For example, in FIGS. 6A and 6B, rings of stationary core 618 and rotating core 620 have segmented core sections 634 that lie in an angular relationship with respect to one another to form "circular disks" of the transformer core. Similarly, as shown in FIG. 6C, intermediate core 632 includes segmented core sections which define rings 632*a* and 632*b*.

In operation, primary 614 is excited from an external AC source to produce flux which is efficiently coupled into intermediate core 632. The flux circulating within intermediate core 632 induces a voltage onto secondary 616. The induced voltage is rectified with regulating circuit 610 and provided to superconducting coil 612, via current leads 613. As was the case with the embodiments discussed above, regulating circuit is disposed within the cold space (as shown in FIG. 1).

Figure 7:
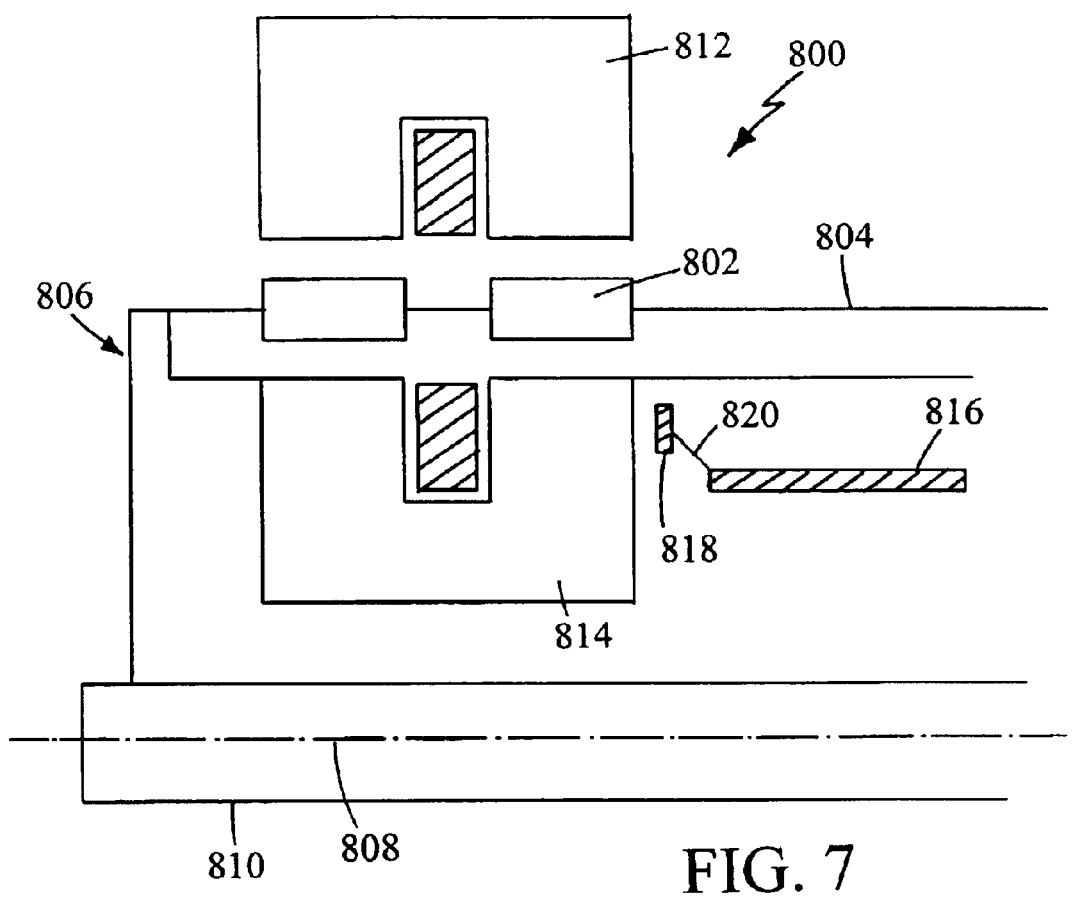
FIG. 7 is a diagrammatic representation of still another alternative embodiment of a brushless exciter including an intermediate core.

Referring to FIG. 7, an alternative embodiment of a brushless exciter 800 having an intermediate core 802 is shown. In this embodiment, intermediate core 802 is incorporated within the outer cylindrical wall 804 of room temperature enclosure 806 and rotates about longitudinal axis 808 of a shaft 810 of the rotor assembly. As was the case in the embodiments of FIGS. 5 and 6, a primary 812 is stationary and is maintained at room temperature outside enclosure 806 while a secondary 814 is positioned within the rotating reference frame at cryogenic temperatures. Secondary 814 is electrically coupled to a superconducting field coil 816 through regulating electronics 818 and current leads 820. It is important to note that although the embodiments described above in conjunction with FIGS. 5–7 were single phase transformer embodiments, the concept of using an intermediate core can be utilized with polyphase transformers (e.g., 3 phase transformers).

Other embodiments are within the scope of the claims.

What is claimed is:

1. An exciter assembly for supplying power to a superconducting load disposed within a cryogenic region of a rotating machine, the exciter assembly comprising:

a transformer having a primary winding and a secondary winding, one of the primary and secondary windings being positioned in a rotational reference frame relative to the other of the primary and secondary windings; and a rotatable enclosure including a wall having an intermediate core formed of a high permeability material, the intermediate core positioned between the primary winding of the transformer and the secondary winding of the transformer, the transformer and rotatable enclosure together configured to magnetically couple alternating current flux between the primary winding of the transformer and the secondary winding of the transformer.

2. The exciter assembly of claim 1 wherein the primary winding is disposed external to the rotatable enclosure and the secondary winding is disposed within the rotatable enclosure.

3. The exciter assembly of claim 1 wherein the primary winding is in the form of a stationary disk and the secondary winding is in the form of a rotatable disk axially spaced from the stationary disk to form a gap therebetween, the wall of the rotatable enclosure disposed within the gap.

4. The exciter assembly of claim 3 wherein at least one of the stationary disk and the rotatable disk is formed of radial laminations.

5. The exciter assembly of claim 4 wherein the intermediate core is formed of radial laminations.

6. The exciter assembly of claim 3 wherein the stationary disk and the rotatable disk are each formed of core segments, each core segment on each of the stationary disk and rotational disk disposed in a radial direction and angularly spaced from another core segment of the stationary disk and rotational disk, respectively.

7. The exciter assembly of claim 6 wherein the intermediate core is formed of core segments, each core segment on the intermediate core disposed in a radial direction and angularly spaced from another core segment of the intermediate core.

8. A rotatable enclosure surrounding a housing having an internal volume for supporting cryogenically-cooled components, the rotatable enclosure comprising a wall including a flux window formed of a high permeability material, the flux window positioned between a primary of a transformer disposed external to the rotatable enclosure and a secondary of the transformer disposed within the rotatable enclosure to magnetically couple alternating current flux between the primary winding of the transformer and the secondary winding of the transformer.

* * * * *